(12) United States Patent
Kaltenbach et al.

(10) Patent No.: US 9,488,260 B2
(45) Date of Patent: Nov. 8, 2016

(54) RANGE-CHANGE TRANSMISSION OF A MOTOR VEHICLE

(71) Applicant: ZF Friedrichshafen AG, Friedrichshafen (DE)

(72) Inventors: Johannes Kaltenbach, Friedrichshafen (DE); Eckhardt Lübke, Friedrichshafen (DE); Michael Wechs, Lindau (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 14/760,735

(22) PCT Filed: Jan. 7, 2014

(86) PCT No.: PCT/EP2014/050109
§ 371 (c)(1),
(2) Date: Jul. 14, 2015

(87) PCT Pub. No.: WO2014/121957
PCT Pub. Date: Aug. 14, 2014

(65) Prior Publication Data
US 2015/0354681 A1 Dec. 10, 2015

(30) Foreign Application Priority Data

Feb. 7, 2013 (DE) .......................... 10 2013 202 045

(51) Int. Cl.
*F16H 37/02* (2006.01)
*F16H 37/04* (2006.01)

(52) U.S. Cl.
CPC ....... *F16H 37/046* (2013.01); *F16H 2037/049* (2013.01); *F16H 2200/0078* (2013.01); *F16H 2200/0082* (2013.01); *F16H 2200/2007* (2013.01)

(58) Field of Classification Search
CPC .................... F16H 37/046; F16H 2200/0082; F16H 2200/0078; F16H 2037/049; F16H 2200/2007
See application file for complete search history.

(56) References Cited

U.S. PATENT DOCUMENTS 4,802,375 A   2/1989  Stodt
6,869,379 B2 * 3/2005  Voss ........................ F16H 37/04
                                                                475/207

(Continued)

FOREIGN PATENT DOCUMENTS

DE     28 42 943 A1    4/1980
DE     35 43 269 A1    6/1987

(Continued)

OTHER PUBLICATIONS

Müller, Herbert W: "Die Umlaufgetriebe [Elektronische Ressource]." Zweite neubearbeitete and erweiterte Auflage. Berlin, Heidelberg: Spring, Imprint: Spring, 1998 (Konstruktionbücher, 28). ISBN: 9783642636981.
German Search Report Corresponding to 10 2013 202 045.7 mailed Jan. 9, 2015.

(Continued)

*Primary Examiner* — David J Hlavka
(74) *Attorney, Agent, or Firm* — Davis & Bujold, PLLC; Michael J. Bujold

(57) ABSTRACT

A group transmission of a motor vehicle having a main transmission and a downstream range group. The range group has two gear steps for different speed ranges and a reversing step for reverse driving. The range group has two planetary gearsets, each with a planet carrier, a sun and ring gears. To engage a driving range for lower speeds, the sun gear of the second gearset and the ring gear of the first gearset are locked to the housing by a first clutch. To engage a driving range for higher speeds, two respective elements of the two gearsets can be connected to one another, in a rotationally fixed manner, by a second clutch. To engage a reversing driving range, the planet carrier of the first gearset and the ring gear of the second gearset are locked relative to the housing by a third clutch.

16 Claims, 14 Drawing Sheets

(56) References Cited

U.S. PATENT DOCUMENTS

| | | |
|---|---|---|
| 7,824,302 B2 | 11/2010 | Diosi et al. |
| 7,857,724 B2 | 12/2010 | Heinzelmann |
| 8,210,981 B2 | 7/2012 | Bauknecht et al. |
| 8,408,084 B2 | 4/2013 | Gitt et al. |
| 8,545,364 B2 | 10/2013 | Ziemer et al. |
| 8,597,153 B2 | 12/2013 | Saitoh et al. |
| 8,936,529 B2 * | 1/2015 | Kaltenbach ........... F16H 37/042 475/271 |
| 9,115,789 B2 * | 8/2015 | Lubke ................... F16H 37/046 |
| 9,279,498 B2 * | 3/2016 | Kaltenbach ........... F16H 37/046 |
| 2008/0182700 A1 * | 7/2008 | Earhart .................... F16H 37/04 475/207 |
| 2008/0245167 A1 * | 10/2008 | Gitt ......................... F16H 3/006 74/331 |
| 2009/0036247 A1 * | 2/2009 | Earhart ............... F16H 37/0833 475/35 |

FOREIGN PATENT DOCUMENTS

| | | |
|---|---|---|
| DE | 44 22 900 A1 | 11/1994 |
| DE | 10 2005 014 592 A1 | 10/2006 |
| DE | 10 2007 047 671 A1 | 4/2009 |
| DE | 10 2008 000 428 A1 | 9/2009 |
| DE | 10 2008 031 456 A1 | 1/2010 |
| DE | 10 2009 026 703 A1 | 12/2010 |
| EP | 0 618 382 A1 | 10/1994 |
| EP | 1 825 168 B1 | 8/2010 |

OTHER PUBLICATIONS

International Search Report Corresponding to PCT/EP2014/050109 mailed Mar. 25, 2014.

Written Opinion Corresponding to PCT/EP2014/050109 mailed Mar. 25, 2014.

* cited by examiner

| Shifting Element / Gear | S1 | S2 | S3 | SB | SR | i | φ |
|---|---|---|---|---|---|---|---|
| G1 | A |  | E | L |  | 17.92 |  |
| G2 | B |  | E | L |  | 13.81 | 1.30 |
| G3 | A | D |  | L |  | 10.63 | 1.30 |
| G4 | B | D |  | L |  | 8.16 | 1.30 |
| G5 | A | C |  | L |  | 6.28 | 1.30 |
| G6 | B | C |  | L |  | 4.83 | 1.30 |
| G7 | A |  | E | H |  | 3.71 | 1.30 |
| G8 | B |  | E | H |  | 2.86 | 1.30 |
| G9 | A | D |  | H |  | 2.20 | 1.30 |
| G10 | B | D |  | H |  | 1.69 | 1.30 |
| G11 | A | C |  | H |  | 1.30 | 1.30 |
| G12 | B | C |  | H |  | 1.00 | 1.30 |
| R1 | A |  | E |  | R | -24.71 |  |
| R2 | B |  | E |  | R | -19.05 | 1.30 |
| R3 | A | D |  |  | R | -14.65 | 1.30 |
| R4 | B | D |  |  | R | -11.26 | 1.30 |
| R5 | A | C |  |  | R | -8.66 | 1.30 |
| R6 | B | C |  |  | R | -6.66 | 1.30 |

| Shifting Element \ Gear | S1 | S2 | S3 | SB | SR' | i | φ |
|---|---|---|---|---|---|---|---|
| G1 | A |   | E | L |   | 25,21 |   |
| G2 | B |   | E | L |   | 19,81 | 1,29 |
| G3 | A | D |   | L |   | 15,25 | 1,29 |
| G4 | B | D |   | L |   | 11,91 | 1,28 |
| G5 | A | C |   | L |   | 9,37 | 1,27 |
| G6 | B | C |   | L |   | 7,26 | 1,29 |
| G7 | A |   |   | L | M | 5,64 | 1,29 |
| G8 | B |   |   | L | M | 4,39 | 1,29 |
| G9 | A |   |   | H | M | 3,47 | 1,26 |
| G10 | B |   |   | H | M | 2,70 | 1,29 |
| G11 | A | D |   | H |   | 2,10 | 1,29 |
| G12 | B | D |   | H |   | 1,64 | 1,28 |
| G13 | A | C |   | H |   | 1,29 | 1,27 |
| G14 | B | C |   | H |   | 1,00 | 1,29 |
| R1 | A |   | E |   | R | -31,31 |   |
| R2 | B |   | E |   | R | -24,36 | 1,29 |
| R3 | A | D |   |   | R | -18,95 | 1,29 |
| R4 | B | D |   |   | R | -14,80 | 1,28 |
| R5 | A | C |   |   | R | -11,64 | 1,27 |
| R6 | B | C |   |   | R | -9,02 | 1,29 |

| Shifting Element / Gear | S1 | S2 | S3' | SB | SR | i | φ |
|---|---|---|---|---|---|---|---|
| G1 | A | | E | L | | 25.21 | |
| G2 | B | | E | L | | 19.61 | 1,29 |
| G3 | A | D | | L | | 15.25 | 1,29 |
| G4 | B | D | | L | | 11.91 | 1,28 |
| G5 | A | C | | L | | 9.37 | 1,27 |
| G6 | B | C | | L | | 7.26 | 1,29 |
| G7 | A | | M | L | | 5.64 | 1,29 |
| G8 | B | | M | L | | 4.39 | 1,29 |
| G9 | A | | M | H | | 3.47 | 1,26 |
| G10 | B | | M | H | | 2.70 | 1,29 |
| G11 | A | D | | H | | 2.10 | 1,29 |
| G12 | B | D | | H | | 1.64 | 1,28 |
| G13 | A | C | | H | | 1.29 | 1,27 |
| G14 | B | C | | H | | 1.00 | 1,29 |
| R1 | A | | E | | R | -31.31 | |
| R2 | B | | E | | R | -24.36 | 1,29 |
| R3 | A | D | | | R | -18.95 | 1,29 |
| R4 | B | D | | | R | -14.80 | 1,28 |
| R5 | A | C | | | R | -11.64 | 1,27 |
| R6 | B | C | | | R | -9.02 | 1,29 |

| Shifting Element / Gear | K | S1' | S2' | S3* | S4' | SB | SR | i |
|---|---|---|---|---|---|---|---|---|
| G1 | K1 |  | C' |  | F' | L |  | 19,13 |
| G2 | K2 | B' |  |  | F' | L |  | 14,38 |
| G3 | K1 |  | D' |  | F' | L |  | 10,88 |
| G4 | K2 | A' |  |  | F' | L |  | 8,25 |
| G5 | K1 |  |  | E' |  | L |  | 6,25 |
| G6 | K1 |  | C' |  | M | L |  | 5,03 |
| G7 | K2 | B' |  |  | M | L |  | 3,78 |
| G8 | K1 |  | D' |  | M | L |  | 2,86 |
| G9 | K2 | A' |  |  | M | L |  | 2,17 |
| G10 | K1 |  | D' |  | M | H |  | 1,74 |
| G11 | K2 | A' |  |  | M | H |  | 1,32 |
| G12 | K1 |  |  | E' |  | H |  | 1,00 |
| G13 | K2 | A' | D' | E' |  | H |  | 0,76 |
| R1 | K1 |  | C' |  | F' |  | R | -21,85 |
| R2 | K2 | B' |  |  | F' |  | R | -16,42 |
| R3 | K1 |  | D' |  | F' |  | R | -12,42 |
| R4 | K2 | A' |  |  | F' |  | R | -9,42 |
| R5 | K1 |  |  | E' |  |  | R | -7,14 |
| R6 | K2 | A' | D' | E' |  |  | R | -5,43 |

| Shifting Element / Gear | K | S1' | S2' | S3* | S4' | SB | SR | i |
|---|---|---|---|---|---|---|---|---|
| G1 | K1 | | C' | | F' | L | | 19,13 |
| G2 | K2 | B' | | | F' | L | | 14,38 |
| G3 | K1 | | D' | | F' | L | | 10,88 |
| G4 | K2 | A' | | | F' | L | | 8,25 |
| G5 | K1 | | | E' | | L | | 6,25 |
| G6 | K1 | | C' | | M | L | | 5,03 |
| G7 | K2 | B' | | | M | L | | 3,78 |
| G8 | K1 | | D' | | M | L | | 2,86 |
| G9 | K2 | B' | | | M | H | | 2,30 |
| G10 | K1 | | D' | | M | H | | 1,74 |
| G11 | K2 | A' | | | M | H | | 1,32 |
| G12 | K1 | | | E' | | H | | 1,00 |
| G13 | K2 | A' | D' | E' | | H | | 0,76 |
| R1 | K1 | | C' | | F' | | R | -21,85 |
| R2 | K2 | B' | | | F' | | R | -16,42 |
| R3 | K1 | | D' | | F' | | R | -12,42 |
| R4 | K2 | A' | | | F' | | R | -9,42 |
| R5 | K1 | | | E' | | | R | -7,14 |
| R6 | K2 | A' | D' | E' | | | R | -5,43 |

| Shifting Element / Gear | K | S1' | S2' | S3' | S4' | SB | SR | i |
|---|---|---|---|---|---|---|---|---|
| G1 | K1 |    | C' |    | F' | L |    | 19.13 |
| G2 | K2 | B' |    |    | F' | L |    | 14.38 |
| G3 | K1 |    | D' |    | F' | L |    | 10.88 |
| G4 | K2 | A' |    |    | F' | L |    | 8.25 |
| G5 | K1 |    |    | E' |    | L |    | 6.25 |
| G6 | K1 |    | C' |    | M  | L |    | 5.03 |
| G7 | K2 | B' |    |    | M  | L |    | 3.78 |
| G8 | K1 |    | C' |    | M  | H |    | 3.06 |
| G9 | K2 | B' |    |    | M  | H |    | 2.30 |
| G10 | K1 |   | D' |    | M  | H |    | 1.74 |
| G11 | K2 | A' |    |    | M  | H |    | 1.32 |
| G12 | K1 |   |    | E' |    | H |    | 1.00 |
| G13 | K2 | A' | D' | E' |    | H |    | 0.76 |
| R1 | K1 |    | C' |    | F' |   | R | -21.85 |
| R2 | K2 | B' |    |    | F' |   | R | -16.42 |
| R3 | K1 |    | D' |    | F' |   | R | -12.42 |
| R4 | K2 | A' |    |    | F' |   | R | -9.42 |
| R5 | K1 |    |    | E' |    |   | R | -7.14 |
| R6 | K2 | A' | D' | E' |    |   | R | -5.43 |

RANGE-CHANGE TRANSMISSION OF A MOTOR VEHICLE

This application is a National Stage completion of PCT/EP2014/050109 filed Jan. 7, 2014, which claims priority from German patent application serial no. 10 2013 202 045.7 filed Feb. 7, 2013.

FIELD OF THE INVENTION

The invention concerns a group transmission for a motor vehicle, for example a heavy goods vehicle, comprising a main transmission with at least one input shaft and on the output side a main shaft, and with at least one range group connected downstream from the main transmission and arranged between the main shaft and an output shaft, wherein the range group is of planetary design with at least two shiftable gear ratio stages for different speed ranges and one shiftable reversing stage for a reverse driving range.

BACKGROUND OF THE INVENTION

Group transmissions with a multi-stage main transmission and at least one range group in drive connection downstream from the main transmission have long been known and are preferably used in heavy good vehicles. Often, there is also a multi-stage splitter group in drive connection upstream from the main transmission. By means of a usually two-stage range group with a gear interval above the total gear interval of the main transmission by approximately an average gear interval between two consecutive gear steps of the main transmission, the spread of the transmission as a whole is approximately doubled and the total number of gears available in the group transmission is also doubled. By means of a usually two-stage splitter group with a gear interval corresponding to approximately half of an average gear interval between two consecutive gear steps of the main transmission, the gear intervals of the main transmission are halved and the total number of gears available in the group transmission is again doubled. In that way, in combination with a three-step main transmission having three forward gears and one reverse gear, a 12-gear group transmission with a total of twelve forward gears and a maximum of four reverse gears is obtained. In combination with a four-step main transmission having four forward gears and one reverse gear, a 16-gear group transmission with a total of sixteen forward gears and a maximum of four reverse gears is obtained.

Compared with a single transmission with a comparable number of gears and similar gear gradation and spread, a group transmission has substantially more compact dimensions and lower weight. However, since many shifts in a group transmission require gearshifts in a number of partial transmissions and therefore take place with relatively complex sequences, most known group transmissions are shifted either in a partially automated or fully automated manner.

A typical design of a group transmission with a main transmission, a splitter group upstream from the main transmission and a range group downstream from the main transmission, is described in DE 44 22 900 A1 In this known transmission the main transmission is of countershaft design and has two countershafts and a main shaft, between which shiftable spur gear stages for three forward gears and one reverse gear are arranged. The splitter group is also of countershaft design, and comprises two spur gear stages also often referred to as shiftable input constants, which are arranged between the input shaft of the group transmission and the correspondingly extended countershafts of the main transmission. When the first input constant on the input side is engaged, the spur gear stage of the transmission-side, second input constant serves as a further shiftable spur gear stage of the main transmission. Furthermore, by means of a direct connection of the input shaft to the main shaft a direct forward gear can be engaged. The range group is of planetary design and comprises a simple planetary gearset with a sun gear, a planetary carrier supporting a number of planetary wheels and a ring gear, wherein the sun gear is connected to the main shaft in a rotationally fixed manner, the planetary carrier is connected rotationally fixed to the output shaft of the group transmission, and the ring gear can alternatively be locked relative to the housing to engage a gear ratio stage for a driving range with lower driving speeds, or else, it can be connected rotationally fixed to the output shaft to engage a gear ratio stage for a driving range with higher driving speeds.

Otherwise than in the group transmission known from DE 44 22 900 A1, the splitter group too can be of planetary design and the range group also of countershaft design. Thus, for example, from EP 0 618 382 B1 various designs of a group transmission are known, which have a countershaft-configured, multi-stage main transmission and an auxiliary transmission connected downstream from the main transmission. The auxiliary transmission comprises a two-stage splitter group and a two-stage range group. In a first version of the auxiliary transmission according to FIG. 2 of the said document, the splitter group is of countershaft configuration, while in contrast the range group, as in the group transmission known from DE 44 22 900 A1, is of planetary design. In contrast, in a second version of the auxiliary transmission according to FIG. 3 of the said document, the splitter group is of planetary configuration and the range group is of countershaft design.

Finally, from EP 1 825 168 B1 a group transmission is known, which comprises a main transmission of countershaft configuration, a two-stage splitter group of countershaft design connected upstream from the main transmission and a range group of planetary design connected downstream from the main transmission. In this case, in a manner known per se the range group is in the form of a simple planetary gearset with a sun gear, a planetary carrier supporting a number of planetary wheels and a ring gear, whose sun gear is connected rotationally fixed to the main shaft of the main transmission. Besides the engagement of two gear ratios for driving ranges with lower and higher speeds, in this range group provision is also made for engaging a reversing stage for a reverse driving range.

When the driving range for lower driving speeds is engaged, the ring gear is locked relative to the housing by a first shifting element and the planetary carrier is connected in a rotationally fixed manner to the output shaft of the group transmission by means of a second shifting element. When the reversing stage for the reverse driving range is engaged, the planetary carrier is locked relative to the housing by the first shifting element and the ring gear is connected rotationally fixed to the output shaft by the second shifting element. When the driving range for higher speed is engaged the first shifting element is in an open, neutral position (with no switching function) and the ring gear as well as the planetary carrier are connected by the second shifting element rotationally fixed to one another and to the output shaft.

By virtue of the reversing stage contained in the range group, it is advantageously possible to do without the arrangement of a shiftable reversing stage in the main group, i.e. the reversing stage present there as such can be omitted or replaced by a spur gear stage for an additional forward gear. However, to realize the shifting function of the range group, two shifting elements are needed, the first shifting element of which is in the form of a dual shifting element with two shift positions and a neutral position and the second of which is a triple shifting element with three shift positions among which is one shift position with triple coupling. Thus, the disadvantage of the range group design known from EP 1 825 168 B1 is the complicated structure in particular of the second shifting element and the need for two shift actuators for the simultaneous actuation of the two shifting elements.

SUMMARY OF THE INVENTION

Accordingly, the purpose of the present invention is to propose a group transmission for a motor vehicle, having a multi-stage main transmission and at least one range group of the type mentioned at the beginning which is in driving connection downstream from the main transmission, in which by contrast with the design known from EP 1 825 168 B1 the shifting mechanisms in the range group are simpler. Moreover, the shifting mechanisms of the range group should optionally be extended by a shiftable gear ratio stage for a driving range of medium driving speeds.

In a group transmission having the characteristics described below, that objective is achieved in that the range group comprises two mutually coupled planetary gearsets each with a sun gear, a planetary carrier supporting a number of planetary wheels and a ring gear, wherein the sun gear of the first planetary gearset is connected rotationally fixed to the main shaft of the main transmission, the planetary carrier of the first planetary gearset is connected rotationally fixed to the ring gear of the second planetary gearset, the ring gear of the first planetary gearset is connected rotationally fixed to the sun gear of the second planetary gearset, the planetary carrier of the second planetary gearset is connected rotationally fixed to the output shaft, the sun gear of the second planetary gearset and hence also the ring gear of the first planetary gearset coupled thereto can be locked relative to the housing by means of a first shifting clutch L in order to engage a driving range with lower driving speeds, whereas to engage a driving range for higher driving speeds two elements of the two planetary gearsets (PS1, PS2) can be connected rotationally fixed to one another by means of a second shifting clutch H, and in which the planetary carrier of the first planetary gearset and hence also the ring gear of the second planetary gearset coupled thereto can be locked relative to the housing by a third shifting clutch R.

Advantageous design features and further developments of this group transmission are also described below.

Thus, the invention starts from a group transmission of a motor vehicle known per se, for example a heavy good vehicle, which comprises a main transmission with at least one input shaft and on its output side a main shaft, and with a range group in drive connection downstream from the main transmission, the range group being arranged between the main shaft and an output shaft, the range group being of planetary design and having at least two shiftable gear ratio stages for different speed ranges as well as a shiftable reversing stage for a reverse driving range.

By constructing the range group in the form of two planetary gearsets coupled in the manner described and owing to the arrangement of the aforesaid shifting clutches, the shifting mechanism of the range group is simplified in such manner that to engage the gear ratio stages for the two speed ranges and for the reverse driving range, in each case only one of the shifting clutches has to be engaged. Thus, to shift-actuate the range group only one shift actuator is needed, which in a range shift is coupled in a selection process to the shifting clutch concerned. Compared with the design known from EP 1 825 168 B1, the shifting mechanism of the range group according to the invention is therefore substantially more simple. Owing to the two coupled planetary gearsets, however, it has to be accepted that the gear structure of the range group is somewhat more complex and requires more fitting space. On the other hand, with the two planetary gearsets the gear ratio spread of the range group is advantageously larger than is possible with only one planetary gearset.

When the driving range for lower driving speeds is engaged, i.e. when the first shifting clutch L is engaged, the gear ratio of the range group is given by the equation: $i_{GP\_low}=(1-i_{01})*(i_{02}-1)/i_{02}$ in which is the stationary gear ratio of the first planetary gearset and $i_{02}$ is the stationary gear ratio of the second planetary gearset. Since when the driving range for higher speeds is engaged, i.e. when the second shifting clutch H is engaged, the transmission elements of the two planetary gearsets are connected to one another and the two planetary gearsets then rotate in a block, the gear ratio of the range group in this case is equal to one ($i_{GP\_high}=1$). It is understood in the context of the invention itself that for this shift position in each case any two respective transmission elements of the two planetary gearsets can be connected to one another by means of the second shifting clutch H. However, a deviation from the aforesaid arrangement of the second shifting clutch H only makes sense if thereby it can be positioned more favorably. When the reverse driving range is engaged, i.e. when the third shifting clutch R is engaged, the gear ratio of the range group is given by the equation: $i_{GP\_rev}=i_{01}*(i_{02}-1)$.

However, the structure of the range group according to the invention also makes it possible in a relatively simple manner to engage an additional driving range for medium speeds. To engage the additional driving range for medium speeds, it is only necessary for the planetary carrier of the first planetary gearset and hence also the ring gear of the second planetary gearset coupled thereto, to be connected in a rotationally fixed manner by means of a fourth shifting clutch M to a driving element of the main transmission which is not permanently connected rotationally fixed to the main shaft or in driving connection therewith.

When the fourth shifting clutch M is engaged, the coupled driving elements of the main transmission and the planetary carrier of the first planetary gearset and the ring gear of the second planetary gearset connected rotationally fixed to the latter form a parallel force transmission branch to the main shaft of the main transmission and the sun gear of the first planetary gearset connected rotationally fixed thereto. Thus, the first planetary gearset then plays no part in the transmission process since with the exception of the planetary carrier of the first planetary gearset, the force flow passes only by way of the transmission elements of the second planetary gearset.

When the driving range for medium driving speeds is engaged, i.e. when the fourth shifting clutch M is engaged and when the first shifting clutch L is engaged, the gear ratio of the range group is given by the equation: $i_{GP\_mid}=(i_{02}-1)/i_{02}$. When the driving range for medium speeds is engaged, i.e. when the fourth shifting clutch M is engaged and when the second shifting clutch H is engaged, the second planetary gearset as such is locked so that the gear ratio of the range group is then again equal to one ($i_{GP\_mid}=1$). Since to engage the driving range for medium speeds, besides the fourth shifting clutch M the first or second shifting clutch as well has to be engaged, a separate shift actuator is needed for the fourth shifting clutch M.

Particularly when the radial fitting space is restricted, the two planetary gearsets of the range group are preferably arranged coaxially and axially offset relative to one another, and then the first planetary gearset is preferably positioned axially between the main transmission and the second planetary gearset.

However, when axial fitting space has to be saved the two planetary gearsets of the range group can also be arranged coaxially and radially offset relative to one another, and the first planetary gearset is then arranged radially inside the second planetary gearset, and the ring gear of the first planetary gearset is then connected rotationally fixed to the sun gear of the second planetary gearset, or made integrally with it.

Since the first shifting clutch L and the second shifting clutch H of the range group are only engaged alternatively, these two shifting clutches L, H are preferably combined in a dual shifting element SB, which simplifies the selection process, i.e. the coupling to the shift actuator concerned.

Since the third shifting clutch R and the fourth shifting clutch M of the correspondingly extended range group are also only engaged alternatively, these two shifting clutches R, M as well can be combined in a dual shifting element SR'. The shift actuation of this dual shifting element SR', however, takes place in each case by means of a separate shift actuator since the fourth shifting clutch M is engaged simultaneously with the first or the second shifting clutch L, H.

The range group with the characteristics of the invention can be combined with a main transmission designed as a countershaft transmission with only one input shaft, wherein on the input side the input shaft can be connected by way of a friction clutch to the driveshaft of a drive engine, and which on the output side can be brought into driving connection selectively with the main shaft by way of a number of shiftable spur gear stages having different gear ratios.

Likewise, the main transmission with which the range group designed according to the invention is combined in a group transmission, can also be in the form of a dual-clutch transmission of countershaft structure with two input shafts, wherein on their input side the two input shafts can in each case be connected by way of respective friction clutches to the driveshaft of a drive engine, and which on the output side can be brought into driving connection selectively with the main shaft by way of a number of shiftable spur gear stages having different gear ratios.

Furthermore, the range group according to the invention can also be combined with other types of main transmissions, such as a main transmission of planetary design, provided that they have in each case at least one input shaft and a main shaft on the output side.

In the case of a main transmission in the form of a simple countershaft transmission or a dual-clutch transmission of countershaft design, a loose wheel mounted to rotate on the main shaft of the last spur gear stage of the main transmission in the force flow direction forms that drive element with which the planetary carrier of the first planetary gearset of the range group can be connected in a rotationally fixed manner by means of the fourth shifting clutch M. In order to obtain suitable gear ratios for the gears of the driving range for medium driving speeds, it is preferable that the gear steps of the main transmission having the highest gear ratios, i.e. the lowest gears of the main transmission, should be engageable by means of the last spur gear stage in the force flow direction.

A similar arrangement of an additional shifting clutch for connecting the planetary carrier of a range group to a driving element of a main transmission is already known per se from DE 10 2007 047 671 A1. The main transmission therein is a multi-stage dual-clutch transmission of countershaft design, and the range group thereof is in the form of a simple planetary gearset that can be shifted by means of a dual shifting element between two gear ratio steps for different speed ranges. The driving element of the main transmission with which the planetary carrier of the range group can be connected in a rotationally fixed manner by means of the additional shifting clutch, is in this case too formed by the loose wheel of a spur gear stage of the main transmission which is last in the force flow direction, whose loose wheel is mounted to rotate on the main shaft. In this known transmission, however, the additional shifting clutch serves exclusively for carrying out a range shift as a powershift, in which a shift both between two gears of the main transmission and also between the two gear ratio stages of the range group takes place.

Since the fourth shifting clutch M of the range group and the shifting clutch E; F' of the last spur gear stage of the main transmission in the force flow direction are only engaged alternatively, as an alternative to the aforesaid combination with the third shifting clutch R of the range group, the fourth shifting clutch M can also be combined in a dual shifting element with the shifting clutch E; F' of the spur gear stage of the main transmission concerned.

In one design version the combination of the shifting clutches R and H in a dual shifting element is also advantageous.

In an advantageous design, to engage the driving range for higher speeds the planetary carrier of the first planetary gearset can be connected rotationally fixed to the sun gear of the second planetary gearset by means of the second shifting clutch (H).

In a further advantageous design, to engage the driving range for higher driving speeds the second shifting clutch H forms a rotationally fixed connection of the ring gear of the first planetary gearset to the planetary carrier of the second planetary gearset.

Besides the advantageous embodiments shown below, other advantageous designs too can be obtained, in which, with a different spatial arrangement of the shifting clutches for engaging the driving range for higher driving speeds by means of the second shifting clutch H, the sun gear of the first planetary gearset can be connected rotationally fixed to the planetary carrier of the second planetary gearset or, in a further design, for engaging the driving range for higher driving speeds the sun gear of the first planetary gearset can be connected rotationally fixed to the ring gear of the second planetary gearset by means of the second shifting clutch H.

BRIEF DESCRIPTION OF THE DRAWINGS

To clarify the invention further, the description is given below of a drawing with a number of example embodiments. The drawings show:

FIG. 5a: A shifting scheme for the group transmission according to FIG. 5, in the form of a shifting table;

FIG. 6a: A shifting scheme for the group transmission according to FIG. 6, in the form of a shifting table;

FIG. 7a: A shifting scheme for the group transmission according to FIG. 7, in the form of a shifting table;

FIG. 8a; A first shifting scheme for the group transmission according to FIG. 8, in the form of a shifting table;

FIG. 8b: A modified, second shifting scheme for the group transmission according to FIG. 8, in the form of a shifting table; and FIG. 8c: A modified, third shifting scheme for the group transmission according to FIG. 8, in the form of a shifting table.

DETAILED DESCRIPTION OF THE PREFERRED EMBODIMENTS

Figure 1:
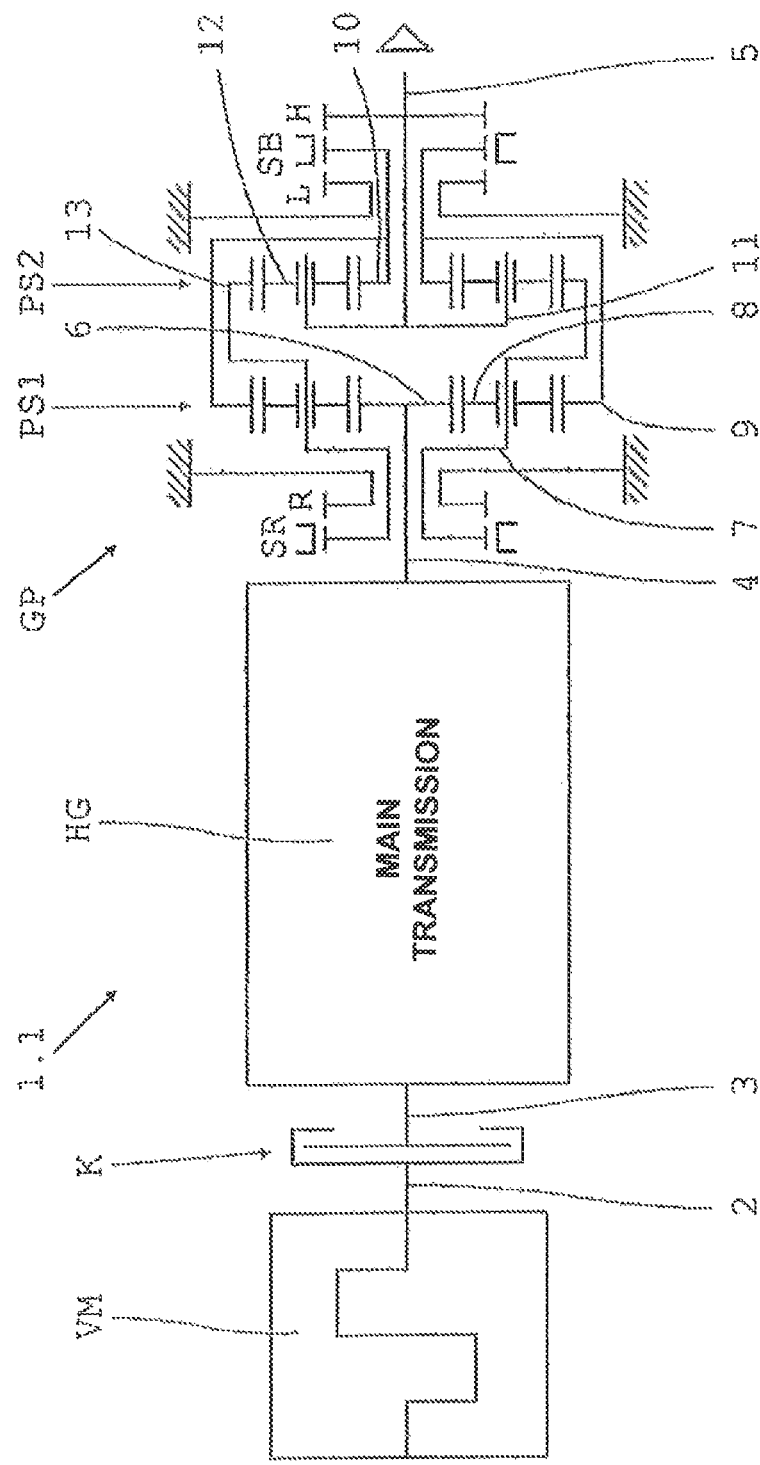
FIG. 1: A schematic view of a drive-train of a motor vehicle having a group transmission with a first embodiment of a range group.

A group transmission 1.1 illustrated in schematic form in FIG. 1 comprises a multi-stage main transmission HG (not shown in greater detail) and a range group GP in drive connection downstream from the main transmission HG. The main transmission HG has an input shaft 3 and on its output side an output shaft 4. The input shaft 3 can be connected by way of a friction clutch K to the driveshaft 2 of a drive engine VM in the form of an internal combustion engine. The range group GP is positioned between the main shaft 4 and an output shaft 5, which (in a manner not shown) is in driving connection with an axle drive such as an axle differential or a transfer box.

The range group GP is of planetary design and comprises two mutually coupled planetary gearsets PS1, PS2, each respectively having a sun gear 6, 10, a planetary carrier 7, 11 that supports a number of planetary wheels 8, 12, and a ring gear 9, 13. In the present case the two planetary gearsets PS1, PS2 of the range group GP are arranged coaxially and axially offset relative to one another, with the first planetary gearset PS1 positioned axially between the main transmission HG and the second planetary gearset PS2. The sun gear 6 of the first planetary gearset PS1 is connected in a rotationally fixed manner to the main shaft 4 of the main transmission HG and thus forms the input element of the range group GP. The planetary carrier 7 of the first planetary gearset PS1 is connected rotationally fixed to the ring gear 13 of the second planetary gearset PS2. The ring gear 9 of the first planetary gearset PS1 is connected rotationally fixed to the sun gear 10 of the second planetary gearset PS2. The planetary carrier 11 of the second planetary gearset PS2 is connected rotationally fixed to the output shaft 5 and thus forms the output element of the range group GP.

The sun gear 10 of the second planetary gearset PS2 and the ring gear 9 of the first planetary gearset PS1 connected to it in a rotationally fixed manner can be locked relative to the housing by means of a first shifting clutch L in order to engage a driving range for lower driving speeds, whereas in order to engage a driving range for higher driving speeds they can be connected rotationally fixed by a second shifting clutch H to the output shaft 5. The first shifting clutch L and the second shifting clutch H of the range group GP are combined in a dual shifting element SB.

To engage a reverse driving range, the planetary carrier 7 of the first planetary gearset PS1 and the ring gear 13 of the second planetary gearset PS2 connected rotationally fixed thereto can be locked relative to the housing by means of a third shifting clutch R. In the present case the third shifting clutch R of the range group GP is part of a single shifting element SR.

Since, in order to engage the gear ratios for the two speed ranges and the reverse driving range, in each case only one of the shifting clutches L, H and R is engaged, to shift-actuate the range group GP only one shift actuator is needed, which for a range shift is coupled in a selection process with the shifting element SB, SR concerned.

When the first shifting clutch L is engaged, the gear ratio of the range group GP is given by the equation: $i_{GP\_low} = (1-i_{01})*(i_{02}-1)/i_{02}$ in which $i_{01}$ is the stationary gear ratio of the first planetary gearset PS1 and $i_{02}$ is the stationary gear ratio of the second planetary gearset PS2. When the second shifting clutch H is engaged, the gear ratio of the range group is equal to one ($i_{GP}=1$), since the transmission elements 6, 7, 9; 10, 11, 13 of the planetary gearsets PS1, PS2 are then connected to one another in a rotationally fixed manner and rotate as a block. When the third shifting clutch R is engaged, the gear ratio of the range group is given by the equation: $i_{GP\_rev} = i_{01}*(i_{02}-1)$.

Figure 2:
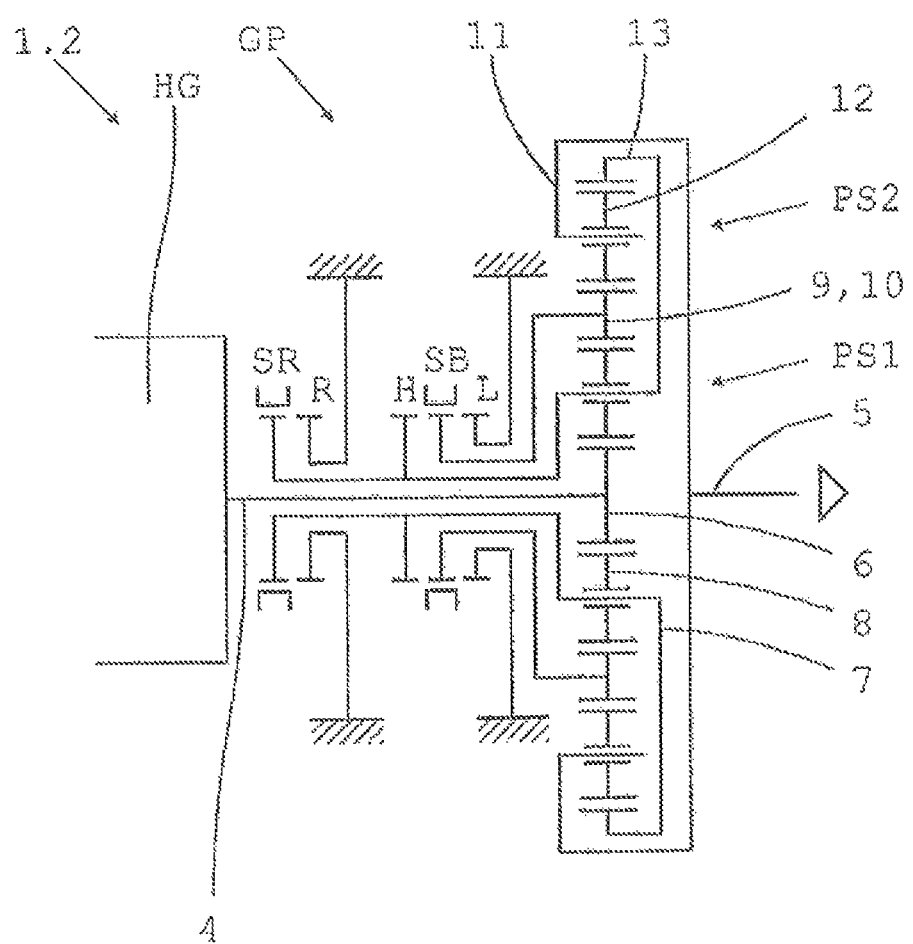
FIG. 2: Part of the drive-train according to FIG. 1, with a second embodiment of the range group.

The group transmission 1.2 part of which is shown schematically in FIG. 2 differs from the group transmission 1.1 according to FIG. 1 only by a different geometrical arrangement of the planetary gearsets PS1, PS2 of the range group. In this embodiment of the range group GP, the two planetary gearsets PS1 PS2 are arranged coaxially and radially offset from one another. The first planetary gearset PS1 is arranged radially inside the second planetary gearset PS2 and the ring gear 9 of the first planetary gearset PS1 is connected rotationally fixed directly to the sun gear 10 of the second planetary gearset PS2 or made integrally with it. The dual shifting element SB in which the first and second shifting clutches L, H are combined is now positioned axially between the single shifting element SR and the two planetary gearsets PS1, PS2. The function of this embodiment of the range group GP according to FIG. 2 corresponds exactly to that of the embodiment of the range group GP according to FIG. 1.

Figure 3:
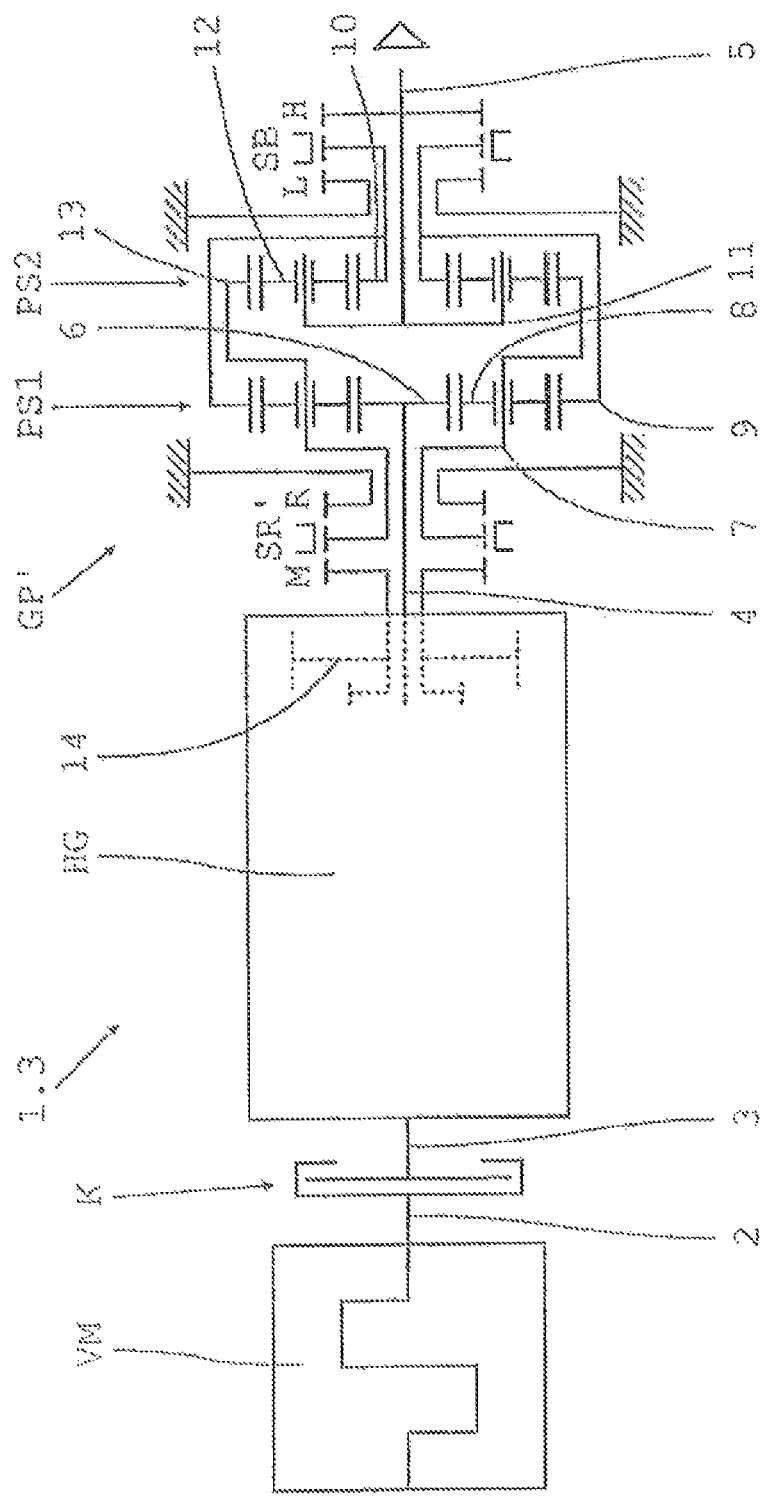
FIG. 3: A drive-train of a motor vehicle with a group transmission having a third embodiment of the range group.

The group transmission 1.3 shown schematically in FIG. 3 differs from the group transmission 1.1 of FIG. 1 in that the shifting functions of the range group GP' are now extended by a further gear step. To engage an additional driving range for medium driving speeds, the planetary carrier 7 of the first planetary gearset PS1 and the ring gear 13 of the second planetary gearset PS2 connected rotationally fixed thereto can now also be connected by means of an additional, fourth shifting clutch M to a driving element 14 of the main transmission HG (only indicated schematically in FIG. 3), which is not permanently connected to the main shaft 4 or in driving connection with it. The third shifting clutch R and the fourth shifting clutch M of the range group GP' are, for example, combined in a dual shifting element SR'.

When the shifting clutch M is engaged, the driving element 14 of the main transmission HG, the planetary carrier 7 of the first planetary gearset PS1 and the ring gear 13 of the second planetary gearset PS2 connected rotationally fixed thereto form a parallel force transmission branch to the main shaft 4 of the main transmission HG and the sun gear 6 of the first planetary gearset PS1 connected rotationally fixed to the latter. Since in this case the first planetary gearset PS1 is bypassed as a gear ratio, the force transmission then takes place in practice only by way of the second planetary gearset PS2. When the first shifting clutch L is engaged and the fourth shifting clutch M is engaged, the gear ratio of the range group GP' is given by the equation: $i_{GP\_mid} = (i_{02}-1)/i_{02}$. In contrast, when the second shifting clutch H is engaged and the fourth shifting clutch M is engaged, the second planetary gearset PS2 as such is locked so that the gear ratio of the range group GP' is then again equal to one ($i_{GP\_mid}=1$). Since to engage the driving range for medium driving speeds, besides the shifting clutch M respectively the first or the second shifting clutch L, H also has to be engaged, a separate shift actuator is needed for the fourth shifting clutch M or for the dual shifting element SR'.

Figure 4:
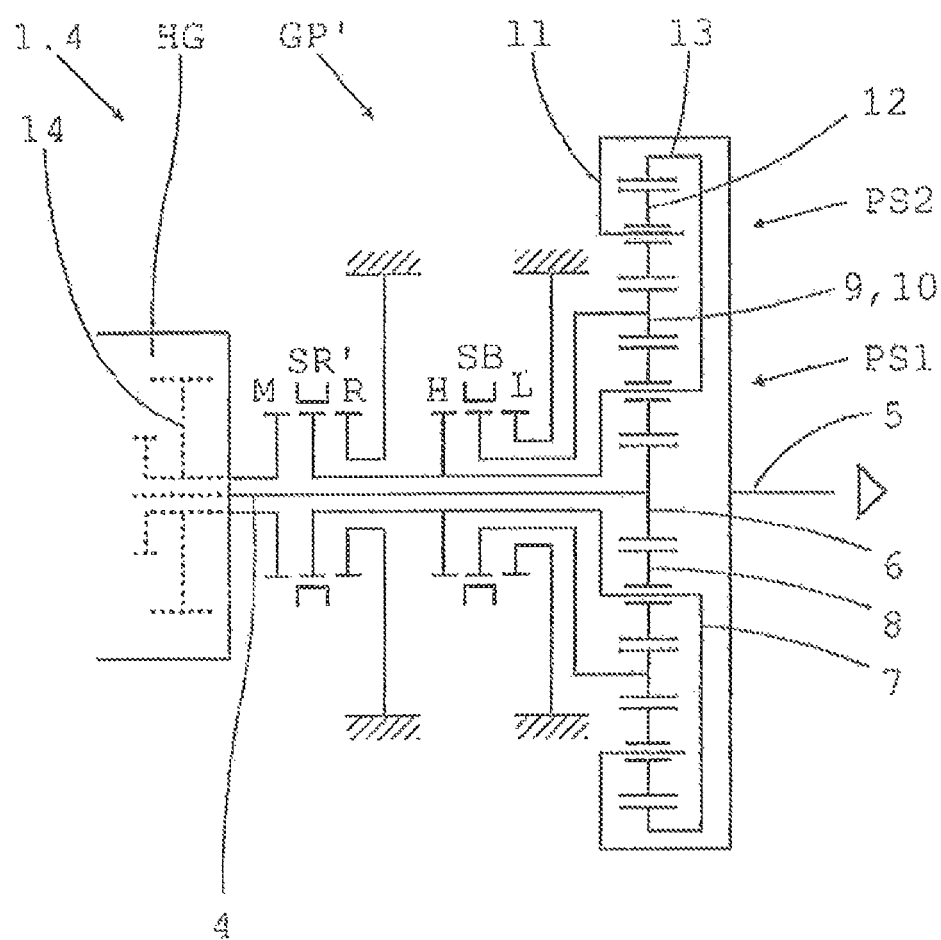
FIG. 4: Part of the drive-train according to FIG. 3, with a fourth embodiment of the range group.

The group transmission 1.4 part of which is shown schematically in FIG. 4 differs from the group transmission 1.3 of FIG. 3 only by a different geometrical arrangement of the planetary gearsets PS1, PS2 of the range group GP'. Analogously to the embodiment of the range group GP shown in FIG. 2, the two planetary gearsets PS1, PS2 are now again arranged coaxially and radially offset relative to one another. The first planetary gearset PS1 is arranged radially inside the second planetary gearset PS2, and the ring gear 9 of the first planetary gearset PS1 is directly connected rotationally fixed to the sun gear 10 of the second planetary gearset PS2 or made integrally with it. The function of the embodiment of the range group GP' according to FIG. 4 is completely identical to that of the version of the range group GP' shown in FIG. 3.

Figure 5:
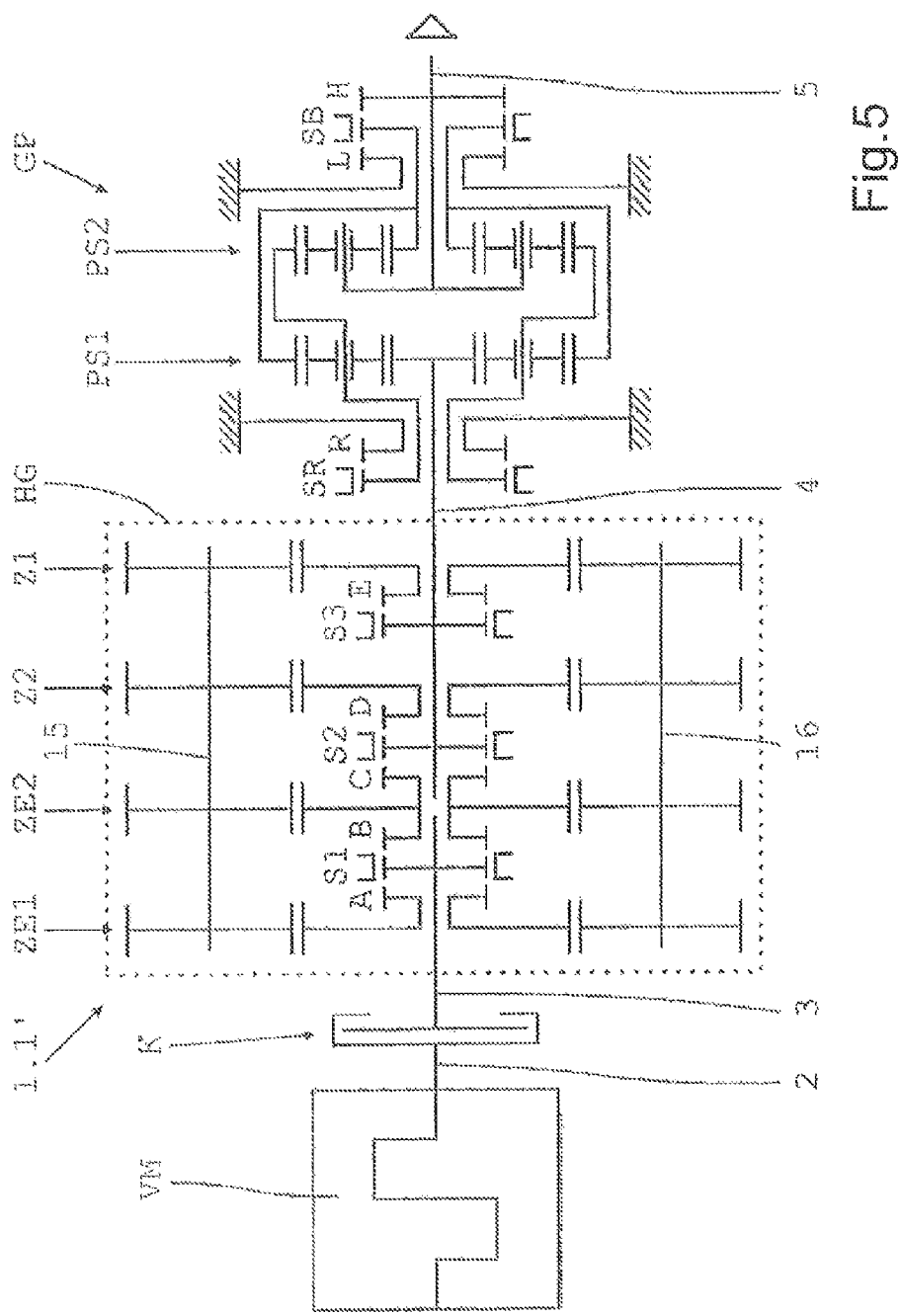
FIG. 5: A drive-train of a motor vehicle with a first configuration of the main transmission and with the first embodiment of the range group, represented schematically.

The group transmission 1.1' illustrated schematically in FIG. 5 corresponds in large measure to the group transmission 1.1 already known from FIG. 1, with the main transmission HG this time shown in a concrete embodiment. In this case, as an example the main transmission HG is made as a countershaft transmission having an input shaft 3, a main shaft 4 arranged coaxially and axially close to the input shaft 3, and two identical countershafts 15, 16 arranged axis-parallel to the input shaft 3 and the main shaft 4. The transmission shafts 3, 4, 15, 16 can be brought selectively into driving connection with one another by way of four spur gear stages ZE1, ZE2, Z1, Z2 and five shifting clutches A, B, C, D, E on the main transmission side. The spur gear stages ZE1, ZE2, Z1, Z2 each have a respective loose wheel mounted to rotate on the input shaft 3 or the main shaft 4, which wheel can be connected in a rotationally fixed manner to its shaft by means of one of the shifting clutches A, B, C, D, E on the main transmission side, as well as two identical fixed wheels each arranged rotationally fixed on one of the two countershafts 15, 16. The five shifting clutches A, B, C, D, E on the main transmission side are combined in pairs in dual shifting elements S1, 32 on the main transmission side. In the present case the shifting clutch E is part of a single shifting element S3.

On the engine side, the input shaft 3 can be connected to the driveshaft 2 of the drive engine VM by means of a friction clutch K. On the transmission side the input shaft 3 can be brought into driving connection with the countershafts 15, 16 by way of the two input spur gear stages ZE1, ZE2 and the associated shifting clutches A, B on the main transmission side. The input spur gear stages ZE1, ZE2 have slightly different gear ratios and act essentially as an input-side splitter group. To engage gears, the two countershafts 15, 16 can be brought into driving connection with the main shaft 4 by way of two spur gear stages Z1, Z2 and the associated shifting clutches D, E on the main transmission side. When the shifting clutch A on the main transmission side is engaged, i.e. when the first input spur gear stage ZE1 is engaged, the loose wheel of the second input spur gear stage ZE2 can also be coupled to the main shaft 4 by way of the shifting clutch C on the main transmission side in order to engage a further gear. In addition, to engage a direct gear the input shaft 3 can also be coupled directly to the main shaft 4 by means of the shifting clutches B and C on the main transmission side.

In combination with the embodiment of the range group GP known from FIG. 1, the group transmission 1.1' thus has twelve forward gears G1-G12 and six reverse gears R1-R6. The associated shifting scheme for this group transmission 1.1' is shown in the form of a shifting table in FIG. 5a in which, for the engaged gears G1-G12, R1-R6, those of the shifting clutches A, B; C, D; F; H; R of the shifting elements S1; S2; S3; SB; SR of the main transmission HG and the range group GP which are engaged in each case, are indicated. In addition, in the last-but-one column of the shifting table examples of the gear ratios i of the engaged gears G1-G12, R1-R6 are shown, assuming for the range group GP a stationary gear ratio $i_{01}=-2.22$ for the first planetary gearset PS1 and a stationary gear ratio $i_{02}=-2.00$ for the second planetary gearset PS2. In the last column of the shifting table the transmission ratio φ between the next-lower gear and the gear G1-G12, R1-R6 concerned is also shown. Accordingly, the group transmission 1.1' has an exactly harmonic gear gradation.

Figure 6:
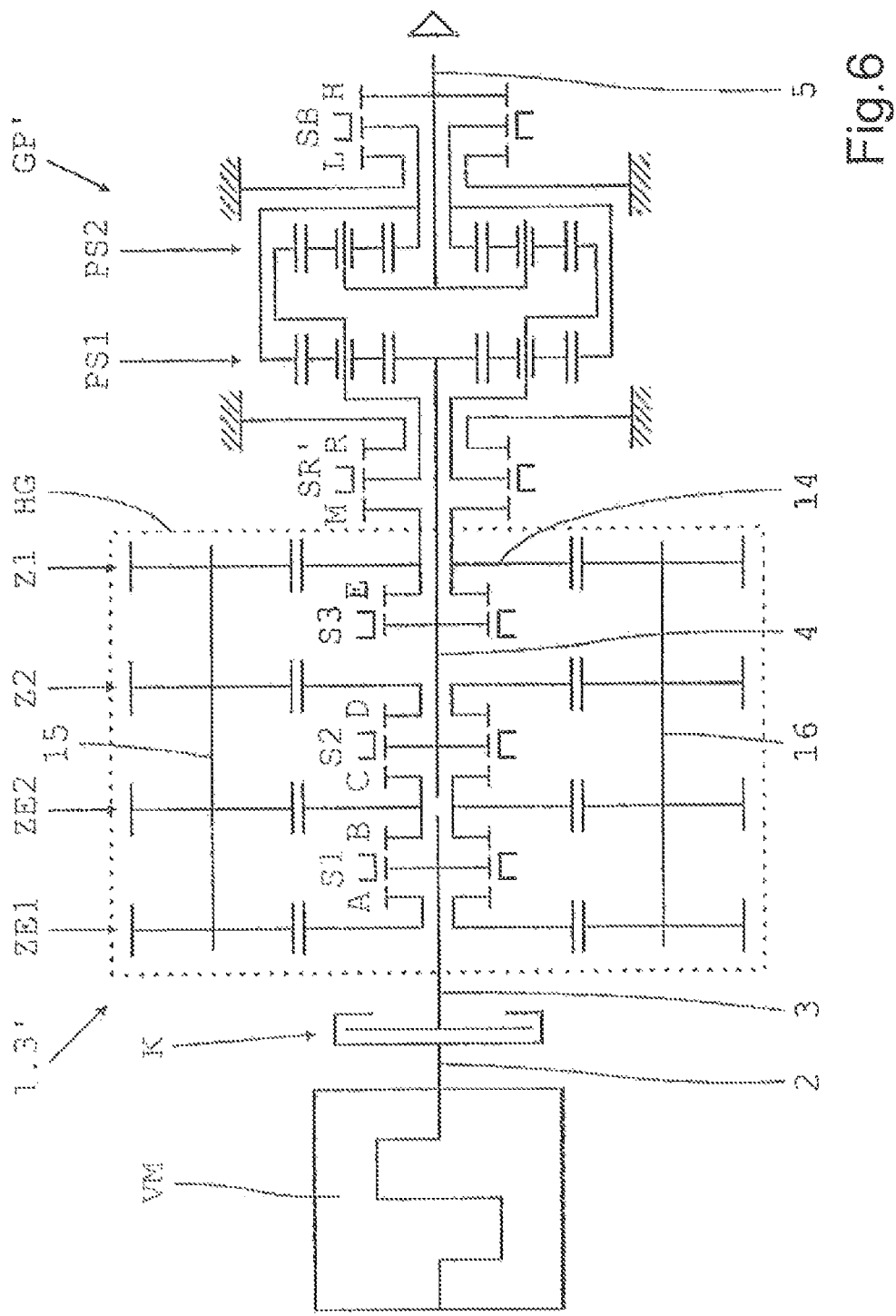
FIG. 6: A drive-train of a motor vehicle with a group transmission comprising the first configuration of the main transmission and the third embodiment of the range group.

The group transmission 1.3' illustrated schematically in FIG. 6 corresponds in large measure to the group transmission 1.3 already known from FIG. 3, wherein the main transmission HG corresponds to that of the group transmission 1.1' in FIG. 5. In the group transmission 1.3', therefore, the main transmission HG designed as a countershaft transmission according to FIG. 5 is combined with the range group GP' according to FIG. 3 extended by the fourth shifting clutch M. By means of the fourth shifting clutch M of the range group GP', the loose wheel 14 mounted to rotate on the main shaft 4, belonging to the last spur gear stage Z1 of the main transmission HG in the force flow direction, can be connected to the planetary carrier 7 of the first planetary gearset PS1 and hence to the ring gear 10 of the second planetary gearset PS2 connected rotationally fixed thereto. The spur gear stage Z1 is thus part of a parallel force transmission branch between the main transmission HG and the range group GP', which can be engaged by means of the fourth shifting clutch M and the first or second shifting clutch L, H of the range group GP'.

Thus, in combination with the embodiment of the range group GP' known from FIG. 3, the group transmission 1.3 provides fourteen forward gears G1-G14 and six reverse gears R1-R6. The associated shifting scheme for the group transmission 1.3' is shown in the form of a shifting table in FIG. 6a, in which, for the engaged gears G1-G14 and R1-R6, those of the shifting clutches A, B; C, D; L, R, M of the shifting elements S1; S2; S3; SB; SR' of the main transmission HG and the range group GP' which are engaged in each case, are indicated. In the last-but-one column of the shifting table examples of the gear ratios i of the engaged gears G1-G14, R1-R6 are again shown, assuming for the range group GP' a stationary gear ratio $i_{01}=-3.47$ for the first planetary gearset PS1 and $i_{02}=-1.60$ for the second planetary gearset PS2. In the last column of the shifting table, again, the transmission ratio φ between the next-lower gear and the gear G1-G14, R1-R6 concerned is also shown. Accordingly, the group transmission 1.3' has a substantially harmonic gear gradation.

Compared with the group transmission 1.1' of FIG. 5, the fourth shifting clutch M of the ranger group GP' provided in the group transmission 1.3' of FIG. 6 enables the additional engagement of the seventh and eighth gears G7, G8. Although in the group transmission 1.3' of FIG. 6 the ninth and tenth gears G9, G10 can also be engaged by the shift combinations A-H-M or B-H-M by virtue of the fourth shifting clutch M, since in this case the planetary gearsets PS1, PS2 of the range group GP' each rotate as a block, the gears G9 and G10 can alternatively also be engaged by the shift combinations A-E-H and B-E-H.

Figure 7:
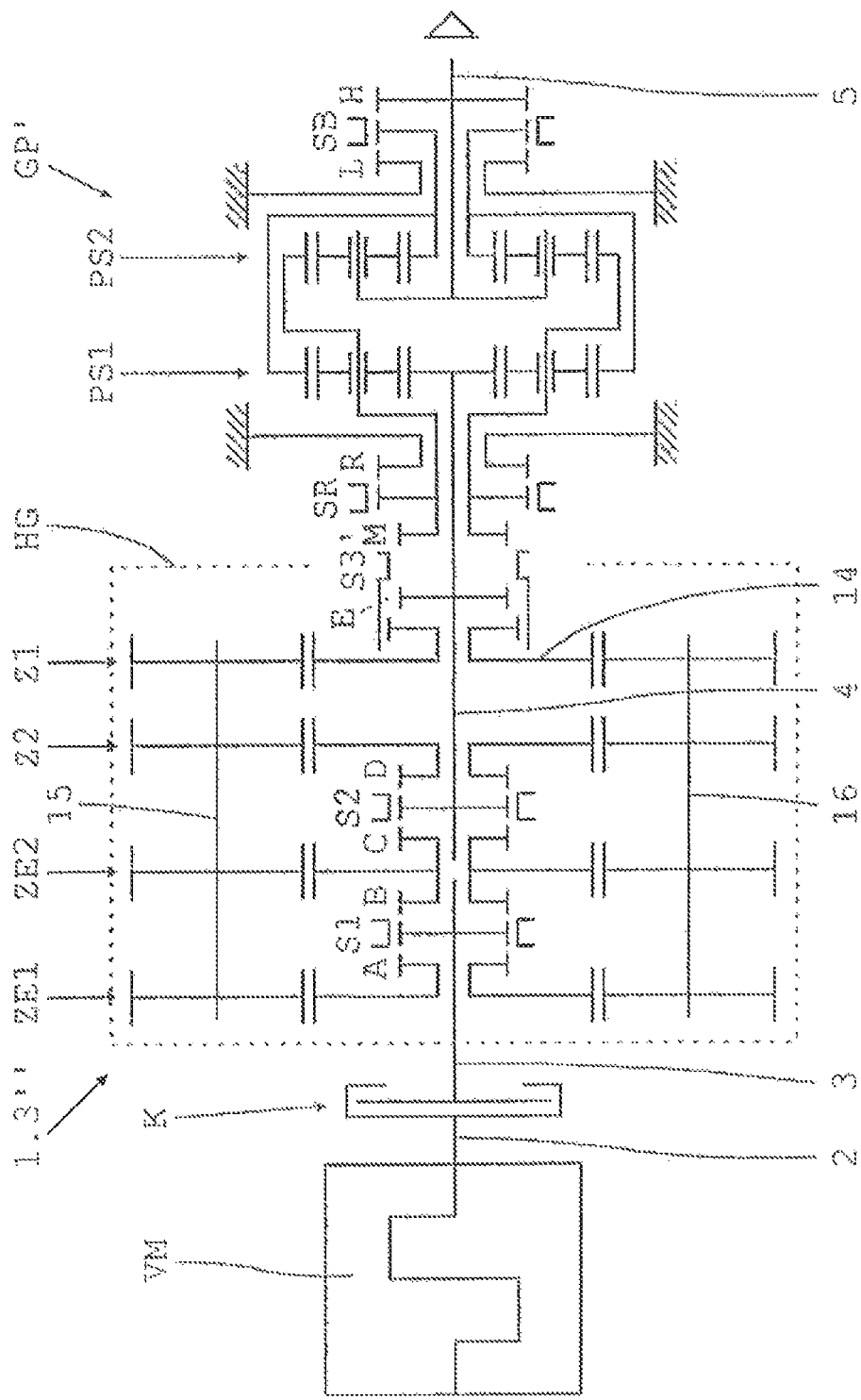
FIG. 7: A drive-train of a motor vehicle with a group transmission comprising the first configuration of the main transmission and the third embodiment of the range group in modified form.

The group transmission 1.3" illustrated schematically in FIG. 7 differs from the group transmission 1.3' known from the previous FIG. 6, only in a different association of the fourth shifting clutch M of the range group GP'. Whereas the fourth shifting clutch M of the range group GP' of the version of the group transmission 1.3' according to FIG. 6 is combined with the third shifting clutch R of the range group GP' in a dual shifting element SR', the fourth shifting clutch M of the range group GP' in the variant of the group transmission 1.3" according to FIG. 7 is, for example, combined with the shifting clutch E of the axially adjacent spur gear stage Z1 of the main transmission HG in a dual shifting element S3'. This dual shifting element S3' is designed such that by means of the shifting clutch E associated with it, the loose wheel 14 of the axially adjacent spur gear stage Z1 of the main transmission HG can alternatively be connected in a rotationally fixed manner to the main shaft 4, or by means of the fourth shifting clutch M of the range group GP', it can be connected rotationally fixed to the planetary carrier 7 of the first planetary gearset PS1 and to the ring gear 10 of the second planetary gearset PS2 coupled thereto.

The shifting functions of the group transmission 1.3" of FIG. 7 are in large measure identical to those of the group transmission 1.3' of FIG. 6. However, owing to the changed association of the fourth shifting clutch M of the range group GP', there is a slight modification of the shifting scheme, which is shown for the embodiment of the group transmission 1.3" of FIG. 7 in the form of a shifting table in FIG. 7a.

Figure 8:
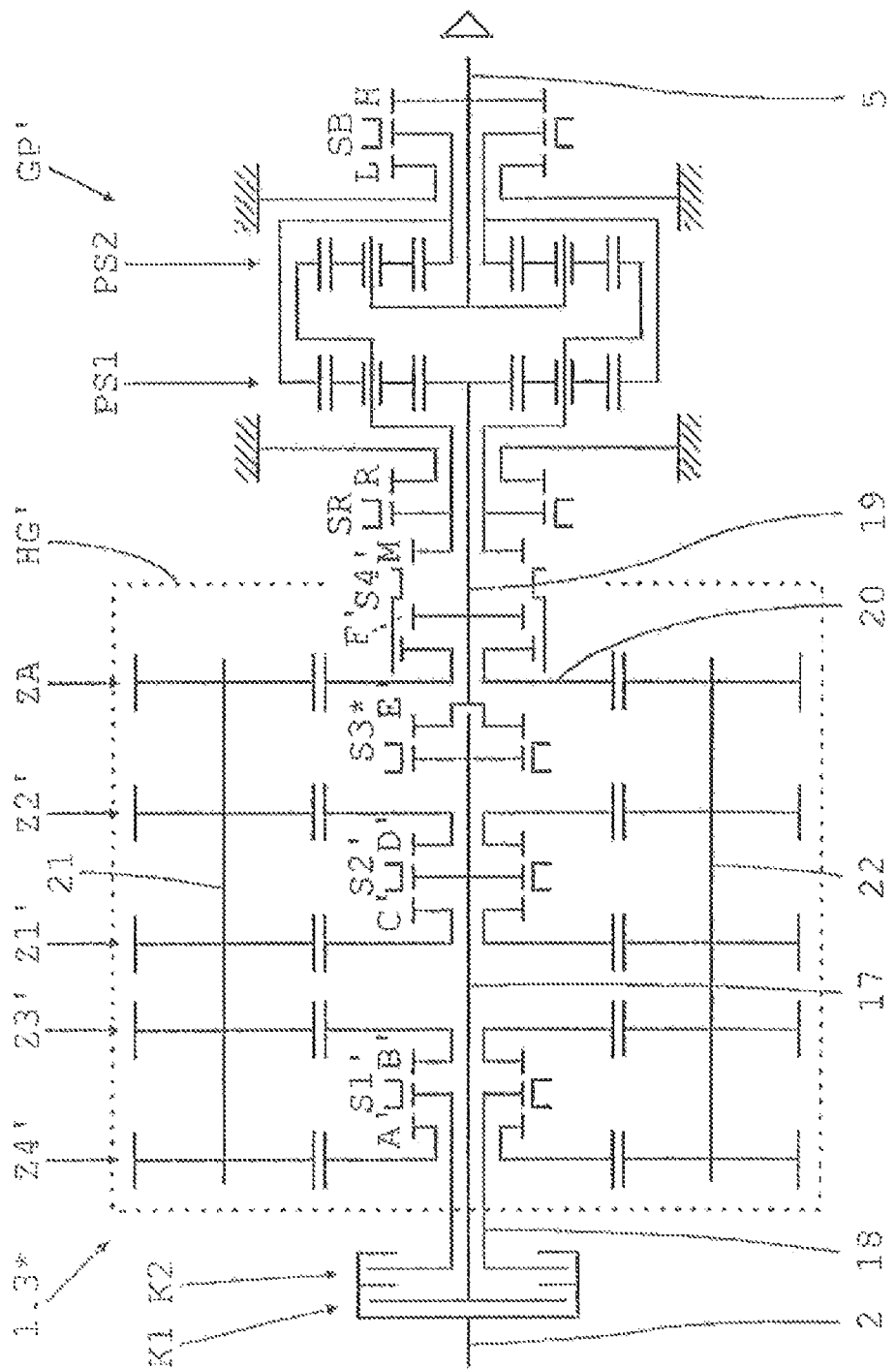
FIG. 8: A drive-train of a motor vehicle with a group transmission comprising a second configuration of the main transmission and the third embodiment of the range group.

The group transmission 1.3* illustrated schematically in FIG. 8 corresponds in principle to the group transmission 1.3" known from the previous FIG. 7, but differs from it in that in this case the main transmission HG is, as an example, in the form of a dual-clutch transmission of countershaft design. This main transmission HG' has two input shafts 17, 18, of which the second input shaft 18 is in the form of a hollow shaft arranged coaxially over the first input shaft 17. The main transmission HG' also has a main shaft 19 on the output side arranged coaxially with and axially adjacent to the first input shaft 17, as well as two identical countershafts 21, 22 arranged axis-parallel to the two input shafts 17, 18 and the main shaft 19 on the output side.

The transmission shafts 17, 18, 19, 21, 22 can be brought selectively into driving connection with one another by way of five spur gear stages Z1', Z2', Z3', Z4', ZA and six shifting clutches A', B', C', E', F', The spur gear stages Z1'-Z4', ZA have in each case a loose wheel mounted to rotate on one of the input shafts 17, 18 or on the main shaft 19, and two identical fixed wheels each arranged rotationally fixed on one of the two countershafts 21, 22. The shifting clutches A'-D' associated with the spur gear stages Z1'-Z4', ZA are combined in pairs in dual shifting elements S1' S2'. A shifting clutch E' on the main transmission side is part of a single shifting element S3* of the main transmission HG'.

In the present case the shifting clutch F' on the main transmission side is, as an example, combined with the fourth shifting clutch M of the range group GP' in a dual shifting element S4'. Analogously to the embodiment of the dual shifting element S3' of the group transmission 1.3" according to FIG. 7, the dual shifting element S4' in this group transmission is designed such that the loose wheel 20 of the output spur gear stage ZA of the main transmission HG', which is mounted to rotate on the main shaft 19, can be connected alternatively by means of the shifting clutch F' to the main shaft 19, or by means of the fourth shifting clutch M of the range group GP' to the planetary carrier 7 of the first planetary gearset PS1 and to the ring gear 10 of the second planetary gearset PS2, in each case in a rotationally fixed manner. The output spur gear stage ZA of the main transmission HG' is thus part of a parallel force transmission branch between the main transmission HG' and the range group GP', which can be engaged by means of the fourth shifting clutch M and one of the two shifting clutches L, H of the range group GP', respectively for producing the slow driving range or the fast driving range.

On the engine side, the two input shafts 17, 18 can be connected by respective friction clutches K1, K2 to the driveshaft 2 of a drive engine (not shown in FIG. 8). On the transmission side these two input shafts 17, 18 can be brought into driving connection with the countershafts 21, 22 by means of in each case two respective spur gear stages Z1', Z2' or Z3', Z4' and by the associated shifting clutches C', D' or A', B'. The two countershafts 21, 22 can be brought into driving connection with the main shaft 19 by way of the output spur gear stage ZA and the associated shifting clutch F' Furthermore, the first input shaft 17 can be coupled directly to the main shaft 19 by means of the shifting clutch E', in order to engage a direct gear. When a spur gear stage Z3', Z4' of the second input shaft 18 is engaged, the two countershafts 21, 22 can if necessary be brought into driving connection with the main shaft 19 by way of a spur gear stage Z1' Z2' associated with the first input shaft 17 and the associated shifting clutch C' or D' and by way of the shifting clutch E'.

Thus, in combination with the range group GP' designed largely identically to that of the group transmission 1.3" according to FIG. 7, the group transmission 1.3* of FIG. 8 has thirteen forward gears G1-G13 and six reverse gears R1-R6. A first associated shifting scheme of this group transmission 1.3* is shown in FIG. 8a in the form of a shifting table in which, for the engaged gears G1-G13, R1-R6, the respective friction clutch K1, K2 and engaged shifting clutches A', B'; C', D'; E'; F', M; L, H; R of the shifting elements S1'; S2'; S3*; S4'; SB; SR of the main transmission HG' and of the range group GP' are indicated. The last column of the shifting table shows as examples the gear ratios i of the engaged gears G1-G13, R1-R6, assuming for the range group GP' a stationary gear ratio of $i_{01}=-2.80$ for the first planetary gearset PS1 and $i_{02}=-1.55$ for the second planetary gearset PS2.

As can be seen from the shifting table in FIG. 8a, shifts between the fifth and sixth gears G5, G6 cannot be carried out as powershifts in a simple manner since those two gears are engaged by way of the first friction clutch K1. However, an upshift from the fifth gear G5 to the sixth gear G6 can be carried out as a powershift if a temporary shift is made to a higher gear that can be engaged by way of the second friction clutch K2, in particular the seventh gear G7, as an intermediate gear. Likewise, a downshift from the sixth gear G6 to the fifth gear G5 can be carried out as a powershift if a temporary shift is made by way of the second friction clutch K2 to a lower gear, in particular the fourth gear G4, as an intermediate gear. When that is considered to be unfavorable, then if a larger gear ratio interval is acceptable it is also possible to do without one of the two gears G5 or G6, and no provision would then be made for engaging the gear G5 or G6 in an associated transmission control unit of the group transmission 1.3*.

A second shifting scheme for the group transmission 1.3* according to FIG. 8, shown in FIG. 8b, differs from the first shifting scheme in FIG. 8a only in that the ninth gear G9, instead of being engaged by way of the shifting combination K2-D'-M-L, is now engaged with a slightly different gear ratio i by the shifting combination K2-B'-M-H.

A third shifting scheme for the group transmission 1.3* according to FIG. 8, shown in FIG. 8c, differs from the second shifting scheme of FIG. 8b only in that the eighth gear G8, instead of being engaged by way of the shifting combination K1-D'-M-L, is now engaged with a slightly different gear ratio i by the shifting combination K1-C'-M-H.

INDEXES 1.1, 1.1' Group transmission
1.2 Group transmission
1.3, 1.3' Group transmission
1.3", 1.3* Group transmission
1.4 Group transmission
2 Driveshaft
3 Input shaft of HG
4 Main shaft of HG
5 Output shaft of GP, GP'
6 Sun gear of PS1
7 Planetary carrier of PS1
8 Planetary wheel of PS1
9 Ring gear of PS1
10 Sun gear of PS2
11 Planetary carrier of PS2
12 Planetary wheel of PS2
13 Ring gear of PS2
14 Driving element of HG, Loose wheel of Z1
15 First countershaft of HG
16 Second countershaft of HG
17 First input shaft of HG'
18 Second input shaft of HG'
19 Main shaft of HG'
20 Driving element of HG', Loose wheel of ZA
21 First countershaft of HG'
22 Second countershaft of HG'
A, B Shifting clutches of HG and S1
A', B' Shifting clutches of HG' and S1
C, D Shifting clutches of HG and 82
C', D' Shifting clutches of HG' and S2
E Shifting clutch of HG and S3, S3'
E' Shifting clutch of HG' and S3'
F' Shifting clutch of HG' and S4'
G1-G14 Forward gears
GP, GP' Range group
H Second shifting clutch of GP, GP' and SB
HG, HG' Main transmission
i Transmission ratio, gear ratio
$i_{01}$ Stationary gear ratio of PS1
$i_{02}$ Stationary gear ratio of PS2
$i_{GP}$ Gear ratio of GP, GP'
$i_{GP\_high}$ Gear ratio of GP, GP' when shifting clutch H is engaged
$i_{GP\_low}$ Gear ratio of GP, GP' when shifting clutch L is engaged
$i_{GP\_mid}$ Gear ratio of GP, GP' when shifting clutches L and M are engaged
$i_{GP\_rev}$ Gear ratio of GP, GP' when shifting clutch R is engaged
K Friction clutch of HG
K1, K2 Friction clutches of HG'
L First shifting clutch of GP, GP' and SB
M Fourth shifting clutch of GP' and S3', S4', SR'
PS1 First planetary gearset of GP, GP'
PS2 Second planetary gearset of GP, GP'
R Third shifting clutch of GP, GP' and SR, SR'
R1-R6 Reverse gears
S1 First dual shifting element of HG
S1' First dual shifting element of HG'
S2 Second dual shifting element of HG
S2' Second dual shifting element of HG'
S3 Single shifting element of HG
S3' Third shifting element of HG
S3' Single shifting element of HG'
S4' Fourth dual shifting element of HG'
SB Dual shifting element of GP, GP'
SR Single shifting element of GP, GP'
SR' Dual shifting element of GP, GP'
VM Drive engine, internal combustion engine
Z1, Z2 Spur gear stages of HG
Z1'-Z4' Spur gear stages of HG"
ZA Output spur gear stage of HG'
ZE1, ZE2 Input spur gear stages of HG

The invention claimed is:

1. A group transmission (1.1, 1.1', 1.2, 1.3, 1.3', 1.3", 1.3*, 1.4) of a motor vehicle, the group transmission comprising:
a main transmission (HG; HG') with at least one input shaft (3; 17, 18) and a main shaft (4; 19) on an output side thereof,
at least one range group (GP, GP') arranged downstream from the main transmission (HG; HG') between the main shaft (4; 19) and an output shaft (5) of the transmission,
the range group being of a planetary design and including at least two shiftable gear ratio steps for different speed ranges and a reversing step for a reverse driving range,
the range group (GP, GP') comprises first and second mutually coupled planetary gearsets (PS1, PS2), each having a sun gear (6, 10), a planetary carrier (7, 11) supporting a plurality of planetary wheels (8, 12) and a ring gear (9, 13),
the sun gear (6) of the first planetary gearset PS1) is connected in a rotationally fixed manner to the main shaft (4; 17) of the main transmission (HG; HG40 ),
the planetary carrier (7) of the first planetary gearset (PS1) is rotationally fixedly connected to the ring gear (13) of the second planetary gearset (PS2),
the ring gear (9) of the first planetary gearset (PS1) is rotationally fixedly connected to the sun gear (10) of the second planetary gearset (PS2),
the planetary carrier (11) of the second planetary gearset (PS2) is rotationally fixedly connected to the output shaft (5),
the sun gear (10) of the second planetary gearset (PS2) is lockable relative to a housing of the transmission by a first shifting clutch (L) to engage a driving range with lower driving speeds, two of the sun gear, the planetary carrier and the ring gear of the first and the second planetary gearsets (PS1, PS2) are connectable to one another by a second shifting clutch (H) to engage a driving range with higher driving speeds, and the planetary carrier (7) of the first planetary gearset (PS1) is lockable relative to the housing by a third shifting clutch (R) to engage the reversing driving range.

2. The group transmission according to claim 1, wherein to engage an additional driving range with medium driving speeds, the planetary carrier (7) of the first planetary gearset (PS1) is connectable in a rotationally fixed manner by a fourth shifting clutch (M) to a driving element (14; 20) of the main transmission (HG; HG'), and the driving element being either rotatably connected to the main shaft (4; 19) or in driving connection therewith.

3. The group transmission according to claim 1, wherein the first and the second planetary gearsets (PS1, PS2) of the range group (GP, GP') are arranged coaxially and axially offset relative to one another, with the first planetary gearset (PS1) arranged between the main transmission (HG, HG40 ) and the second planetary gearset (PS2).

4. The group transmission according to claim 1, wherein the first and the second planetary gearsets (PS1, PS2) of the range group (GP, GP40 ) are arranged coaxially and radially offset relative to one another, the first planetary gearset (PS1) is radially inside the second planetary gearset (PS2), and the ring gear (9) of the first planetary gearset (PS1) is either connected in a rotationally fixed manner to the sun gear (10) of the second planetary gearset (PS2) or is made integrally therewith.

5. The group transmission according to claim 1, wherein the first shifting clutch (L) and the second shifting clutch (H) of the range group (GP, GP') are combined in a dual shifting element (SB).

6. The group transmission according to claim 2, wherein the third shifting clutch (R) and the fourth shifting clutch (M) of the range group (GP, GP') are combined in a dual shifting element (SR').

7. The group transmission according to claim 1, wherein the second shifting clutch (H) and the third shifting clutch (R) are combined in a dual shifting element.

8. The group transmission according to claim 1, wherein the main transmission (HG) is a countershaft transmission having a single input shaft (3) which, on an input side, is connectable by a fourth friction clutch (K) to a driveshaft (2) of a drive engine (VM), and, on the output side, is selectively engagable in driving connection with the main shaft (4) by a number of shiftable spur gear stages (ZE1, ZE2, Z1, Z2) with different gear ratios.

9. The group transmission according to claim 1, wherein the main transmission (HG') is a dual-clutch transmission of countershaft design having two input shafts (17, 18) which, on an input side, are each connectable by a respective further friction clutch (K1, K2) to a driveshaft (2) of a drive engine (VM), and, on the output side, is selectively engagable in driving connection with the main shaft (19) by a number of shiftable spur gear stages (Z1'-Z4', ZA) with different gear ratios.

10. The group transmission according to claim 2, wherein a loose wheel (14; 20) of a last spur gear stage (Z1; ZA) of the main transmission (HG; HG') in a force flow direction is mounted to rotate on the main shaft (4; 19), and is the driving element with which the planetary carrier (7) of the first planetary gearset (PS1) of the range group (GP') is connectable, in a rotationally fixed manner, by the fourth shifting clutch (M).

11. The group transmission according to claim 10, wherein the fourth shifting clutch (M) of the range group (GP, GP') and the shifting clutch (E; F') of the last spur gear stage of the main transmission (HG; HG'), in the force flow direction, are combined in a dual shifting element (S3'; S4').

12. The group transmission according to claim 1, wherein to engage the driving range for the higher driving speeds, the planetary carrier (7) of the first planetary gearset (PS1) is connectable in a rotationally fixed manner to the sun gear (10) of the second planetary gearset (P52) by the second shifting clutch (H).

13. The group transmission according to claim 1, wherein the ring gear (9) of the first planetary gearset (PS1) is connectable, in a rotationally fixed manner, to the planetary carrier (11) of the second planetary gearset (PS2) by the second shifting clutch (H) to engage the driving range for the higher driving speeds.

14. The group transmission according to claim 1, wherein the sun gear of the first planetary gearset is connectable, in a rotationally fixed manner, to the planetary carrier of the second planetary gearset to engage the driving range for the higher driving speeds.

15. The group transmission according to claim 1, wherein the sun gear of the first planetary gearset (PS1) is connectable, in a rotationally fixed manner, to the ring gear of the second planetary gearset (PS2) by the second shifting clutch to engage the driving range for the higher driving speeds.

16. A group transmission of a heavy goods vehicle, the group transmission comprises:
a main transmission having at least one input shaft, on an input side thereof, and a main shaft on an output side thereof;
at least one range group arranged downstream from the main transmission, between the main shaft of the main transmission and an output shaft of the group transmission, and the range group having the output shaft for the group transmission;
the range group comprising a first planetary gearset and a second planetary gearset that are coupled to each other and comprises at least a first shiftable gear ratio step for driving in a low speed range, a second shiftable gear ratio step for driving in a high speed range, and a reversing step for driving in a reverse driving range, each of the first planetary gearset and the second planetary gearset comprises a sun gear, a planet carrier, which supports a plurality of planet gear, and a ring gear;
the sun gear of the first planetary gearset is permanently connected to the main shaft of the main transmission so as to rotate therewith;
the planetary carrier of the first planetary gearset is permanently connected to the ring gear of the second planetary gearset so as to rotate therewith;
the ring gear of the first planetary gearset is permanently connected to the sun gear of the second planetary gearset so as to rotate therewith;
the planetary carrier of the second planetary gearset is permanently connected to the output shaft of the group transmission so as to rotate therewith;
a first shifting clutch is engagable to connect the sun gear of the second planetary gearset to a housing and prevent relative rotation therebetween and engage a driving gear in the low speed range;
a second shifting clutch is engagable to connect the ring gear of the first planetary gearset and the sun gear of the second planetary gearset to the planetary carrier of either the first planetary gearset or the second planetary gearset and prevent relative rotation therebetween and engage a driving gear in the high speed range; and a third shifting clutch is engagable to connect the planetary carrier of the first planetary gearset to the housing and prevent relative rotation therebetween and engage a driving gear in the reversing driving range.

\* \* \* \* \*